US012641384B2

(12) United States Patent
Fukuda et al.

(10) Patent No.: US 12,641,384 B2
(45) Date of Patent: May 26, 2026

(54) BONE CONDUCTION SPEAKER UNIT

(71) Applicant: TEMCO JAPAN CO., LTD., Tokyo (JP)

(72) Inventors: Mikio Fukuda, Tokyo (JP); Tomoya Atsumi, Tokyo (JP)

(73) Assignee: TEMCO JAPAN CO., LTD., Tokyo (JP)

( * ) Notice: Subject to any disclaimer, the term of this patent is extended or adjusted under 35 U.S.C. 154(b) by 0 days.

(21) Appl. No.: 18/723,534

(22) PCT Filed: Aug. 31, 2023

(86) PCT No.: PCT/JP2023/031924
§ 371 (c)(1),
(2) Date: Jun. 24, 2024

(87) PCT Pub. No.: WO2024/090030
PCT Pub. Date: May 2, 2024

(65) Prior Publication Data

US 2025/0254479 A1 Aug. 7, 2025

(30) Foreign Application Priority Data

Oct. 27, 2022 (JP) ................................ 2022-172195

(51) Int. Cl.
*H04R 25/00* (2006.01)

(52) U.S. Cl.
CPC .......... *H04R 25/606* (2013.01); *H04R 25/65* (2013.01); *H04R 2460/13* (2013.01)

(58) Field of Classification Search
CPC .. H04R 1/105; H04R 2460/13; H04R 1/1016; H04R 25/607; H04R 1/1066; H04R 2201/10; H04R 2225/0213
See application file for complete search history.

(56) References Cited

FOREIGN PATENT DOCUMENTS

CN 107920293 B * 7/2019 .......... H04R 1/1091
JP 4683635 B2 5/2011

(Continued)

OTHER PUBLICATIONS

International Search Report for PCT/JP2023/031924 mailed on Nov. 21, 2023.

(Continued)

*Primary Examiner* — Kile O Blair
(74) *Attorney, Agent, or Firm* — Schmeiser, Olsen & Watts LLP

(57) ABSTRACT

A bone conduction speaker unit is provided that can be easily mounted on an ear in a fitted manner does not prevent a normal-hearing person from hearing an external sound, improves sound quality, and does not cause a problem of sound leakage. The bone conduction speaker unit includes a bone conduction speaker and support means that supports the bone conduction speaker and is configured to be housed in a concha cavity. The support means includes a ring having, on its top surface, a column fixed to the bottom surface of the bone conduction speaker and an elastic adapter fitted into a circumferential groove formed on the outer circumferential surface of the ring. The elastic adapter includes an annular portion fitted to the circumferential groove and a convex portion 8 that protrudes horizontally from the annular portion and contacts the inner surface of the concha cavity.

12 Claims, 5 Drawing Sheets

(56) References Cited

FOREIGN PATENT DOCUMENTS

| | | | |
|---|---|---|---|
| JP | 2015-195444 | A | 11/2015 |
| JP | 6427701 | B1 | 11/2018 |
| WO | 2008/029515 | A1 | 3/2008 |

OTHER PUBLICATIONS

Microfilm of the specification and drawings annexed to the request of Japanese Utility Model 1-12 Application No. 193959/1981 (Laid-open No. 104077/1983) (Sony Corp) Jul. 15, 1983 (Jul. 15, 1983). pp. 1-9. fig. 3-5.

* cited by examiner

BONE CONDUCTION SPEAKER UNIT

CROSS-REFERENCE TO RELATED APPLICATIONS

This application is a national stage of PCT Application No. PCT/JP2023/031924, having a filing date of Aug. 31, 2023, claiming priority to Japanese Application No. 2022-172195, having a filing date of Oct. 27, 2022, the entire contents both of which are hereby incorporated by reference.

FIELD OF TECHNOLOGY

The following relates to a bone conduction speaker unit. More specifically, the following relates to a speaker (earphone) that causes a user to hear a sound signal as a bone-conducted sound by transmitting vibration based on the sound signal to the skull of the user, in particular, a bone conduction speaker unit that can be suitably used by a normal-hearing person.

BACKGROUND

As described above, a bone conduction speaker transmits a sound to a user by vibrating the skull of the user. When using the bone conduction speaker, the user needs to contact the vibration surface of the bone conduction speaker with any area of the head and to maintain that state. For this reason, initially, a method of pressing a speaker against a temple and a mastoid process using a head band like an ordinary headphone was used. However, this method is bothersome because a user has to continue to hang the head band on the head. Moreover, this method has been avoided because the state in which a user is wearing the headband is conspicuous. For this reason, a type of bone conduction speaker that is inserted into an earhole, which is similar to an ordinary earphone, has been used. However, when a user uses this type of bone conduction speaker on the street, the speaker makes it difficult for the user to hear an ambient sound and is even dangerous because the speaker blocks the earhole, as a matter of course.

A recent typical usage of a bone conduction speaker for normal-hearing persons has been to hear a normal sound through an ear canal and a drum and to hear other information through the bone conduction speaker. In this case, the bone conduction speaker is placed such that it does not block an earhole and contacts the periphery of an auricle, and the earhole must be open. However, normal-hearing persons tend to preferentially recognize a sound entering through the ear canal due to being a normal-hearing person. This results in a problem that normal hearing persons perceive the bone-conducted sound as a smaller sound. Of course, normal-hearing persons can clearly hear even this level of bon-conducted sound by wearing an earplug and blocking an external sound.

Among background art literatures that disclose a bone conduction speaker that can be placed so as not to block an earhole and contacts the periphery of an auricle assuming that the bone conduction speaker will be used by normal-hearing persons are WO 2008/029515 (Patent Literature 1) and Japanese Patent Publication No. 4683635 (Patent Literature 2).

The device of Patent Literature 1 includes ring-shaped holding means that is mounted on a bone conduction speaker, holds the bone conduction speaker such that the bone conduction speaker contacts a tragus or its vicinity, and is configured to be housed in a concha cavity having a shape such as a C-shape. Both outer surfaces of the holding means contact and continue to push an inner portion of the tragus and the inner surface of the concha cavity so as to be locked to those positions. The device of Patent Literature 2 is a receiving device including a rod-shaped bone conduction speaker, a ring-shaped vibration transmitter that is configured to be housed in a recess including a concha cavity and has a shape and a size such that the vibration transmitter is contacted by a tragus and an antitragus in a pressed manner, and a support portion that supports the bone conduction speaker and is connected to an auricle contact portion.

The size or shape of the concha cavity varies person to person. Both the holding means of the device of Patent Literature 1 and the vibration transmitter of the device of Patent Literature 2 configured to be housed in the concha cavity for use have predetermined sizes. For this reason, these means cannot adapt to ears having various sizes, and whether these means can be fitted into an ear properly depends on the person. Also, when pressing and deforming the ring-shaped holding means to insert the device of Patent Literature 1 into the concha cavity, not a small force is required, and the feeling of mounting is not good. Moreover, the bone conduction speakers of the devices of Patent Literatures 1 and 2 contact an antitragus and an earlobe rather than a tragus. For this reason, the air-conducted sound generation efficiency is low.

SUMMARY

As described above, both the holding means of the device of Patent Literature 1 and the vibration transmitter of the device of Patent Literature 2 have predetermined sizes. This results a problem that these means cannot adapt to human ears having various sizes or the like and whether these means can be fitted into an ear properly depends on the person. These devices also have a problem that the air-conducted sound generation efficiency is low. In view of the foregoing, an aspect of embodiments of the present invention is to provide a bone conduction speaker unit that can be easily mounted on an ear in a fitted manner regardless of the size or shape of the ear, does not prevent a normal-hearing person using the bone conduction speaker unit from hearing an external sound, due to not blocking the earhole, and improves the air-conducted sound generation efficiency and sound quality.

An aspect relates to a bone conduction speaker unit including a bone conduction speaker and support means that supports the bone conduction speaker and is configured to be housed in a concha cavity. The support means includes a ring having, on a top surface thereof, a column fixed to a bottom surface of the bone conduction speaker and an elastic adapter fitted into a circumferential groove formed on an outer circumferential surface of the ring.

In an embodiment, the elastic adapter includes an annular portion fitted into the circumferential groove and a convex portion that protrudes horizontally from the annular portion and contacts an inner surface of the concha cavity when used. The convex portion protrudes in a U-shape or V-shape or protrudes in a balance toy-shape.

In an embodiment, the ring is made of a hard resin, and the elastic adapter is made of a soft material. Multiple elastic adapters having different sizes and/or shapes are prepared for selection and replacement as the elastic adapter.

In an embodiment, the bone conduction speaker is disposed such that a portion thereof covers an opening of the ring.

Embodiments of the invention for solving the above problems comprise a bone conduction speaker unit including a bone conduction speaker, support means that supports the bone conduction speaker and is configured to be housed in a concha cavity, and glasses mounting means configured to cause glasses to support the bone conduction speaker. The support means includes a ring having, on a top surface thereof, a column fixed to a bottom surface of the bone conduction speaker and an elastic adapter fitted into a circumferential groove formed on an outer circumferential surface of the ring. The glasses mounting means includes an elastic support strip and a glasses mounting member. The elastic support strip has one end fixed to the bone conduction speaker and another end fixed to the glasses mounting member. A temple insertion hole is formed through the glasses mounting member. The glasses mounting member is mounted on the glasses by inserting a temple of the glasses into the temple inserted hole.

In an embodiment, fitting holes are formed on both ends of the elastic support strip. The one end of the elastic support strip is fixed to the bone conduction speaker by fitting a lock portion formed on the bone conduction speaker into one of the fitting holes. The other end of the elastic support strip is fixed to the glasses mounting member by fitting a lock portion formed on the glasses mounting member to the other fitting hole.

When mounting, on an ear, one of the bone conduction speaker unit according to embodiments of the present invention thus configured, the elastic adapter is distorted and deformed. Thus, the bone conduction speaker unit is easily mounted on the ear in a fitted manner regardless of the size or shape of the ear and does not prevent a normal-hearing person using the bone conduction speaker unit from hearing an external sound, due to not blocking an earhole. Also, the bone conduction speaker is fixed to the ring through the column and is placed at a position (height) at which the bone conduction speaker does not contact a human body. Thus, as desired effects, the bone conduction speaker is able to efficiently transmit vibration output directly to the earhole and its vicinity through the ring, to efficiently generate an air-conducted sound in the external auditory canal by vibrating the earhole and its vicinity, including the tragus, and thus to improve sound quality.

In embodiments of the invention, the bone conduction speaker may be stably supported in a desired position through the elastic support strip. This produces an effect of improving mountability when a glasses wearer uses the bone conduction speaker unit.

BRIEF DESCRIPTION

Some of the embodiments will be described in detail, with reference to the following figures, wherein like designations denote like members, wherein.

DETAILED DESCRIPTION

Figure 1:
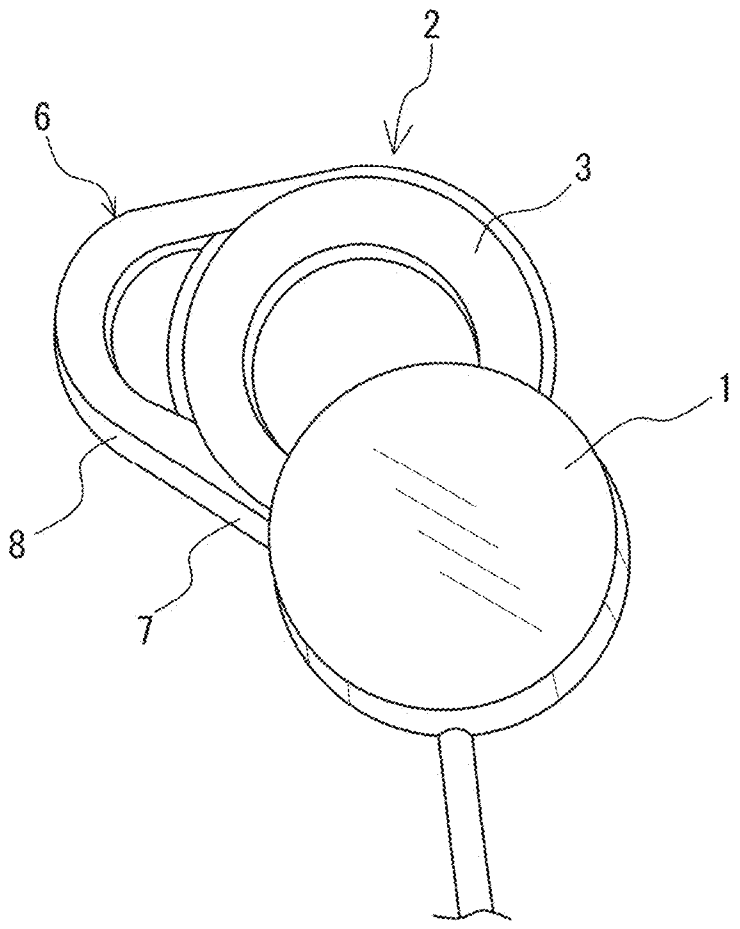
FIG. 1 is a perspective view of an example configuration of a bone conduction speaker unit according to a first embodiment of the present invention.

Embodiments of the present invention will be described in detail with reference to the accompanying drawings. FIGS. 1 to 4 are drawings showing a bone conduction speaker unit according to a first embodiment of the present invention. The bone conduction speaker unit includes a bone conduction speaker 1 and support means 2 that supports the bone conduction speaker 1 and is configured to be housed in a concha cavity. The support means 2 includes a ring 3 having a top surface on which a column 4 is disposed so as to stand and typically made of a hard resin and an elastic adapter 6 fitted into a circumferential groove 5 formed on the outer circumferential surface of the ring 3. The column 4 supports the bone conduction speaker 1 with the top end of the column 4 firmly fixed to the bottom surface of the case of the bone conduction speaker 1 by bonding, welding, screwing, or any other means (see FIGS. 2 and 3).

Figure 2:
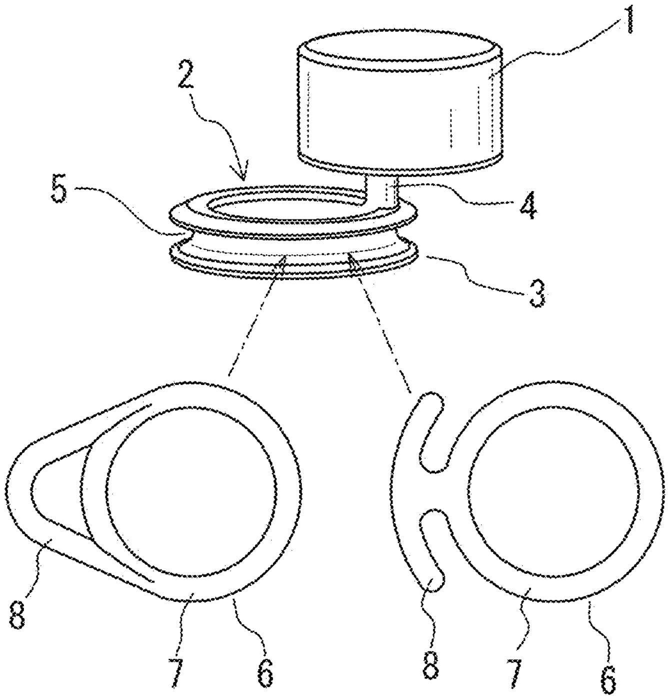
FIG. 2 is an exploded perspective view of the example configuration of the bone conduction speaker unit according to the first embodiment of the present invention.
Figure 3:
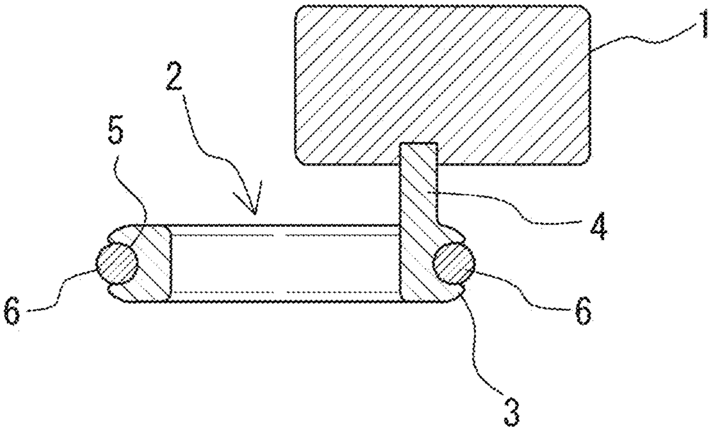
FIG. 3 is a schematic longitudinal sectional view of the example configuration of the bone conduction speaker unit according to the first embodiment of the present invention.
Figure 4:
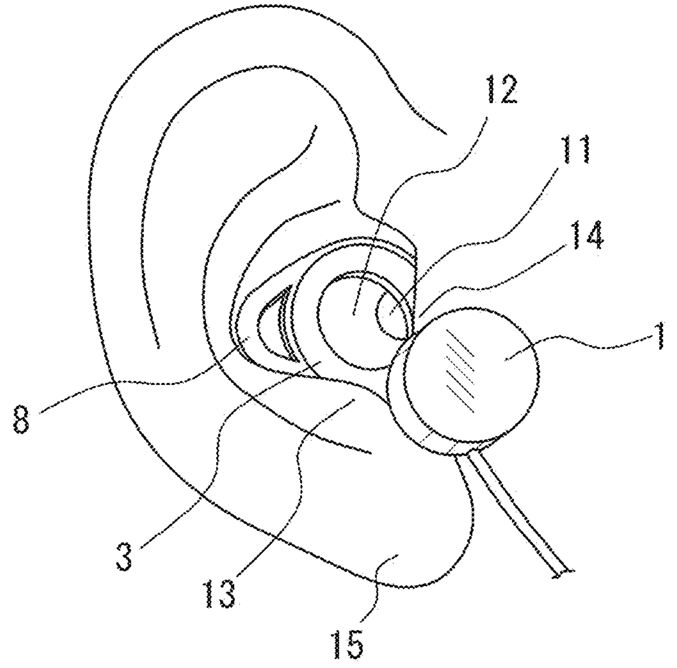
FIG. 4 is a drawing showing a state in which the bone conduction speaker unit according to the first embodiment of the present invention is mounted.

In embodiments, it maybe desirable to dispose the bone conduction speaker 1 such that a portion thereof covers the opening of the ring 3 (see FIGS. 2 and 3). Doing so aims to positively use a sound (high-frequency sound) leaking from the bone conduction speaker 1 by placing the speaker near an earhole 11. Note that the leaking sound can be used more efficiently by disposing the bone conduction speaker 1 so as to completely cover the ring 3. However, in order to visually demonstrate that the earhole 11 is open, the bone conduction speaker 1 is intentionally disposed such that the opening of the ring 3 is exposed.

The elastic adapter 6 is typically made of a soft material such as soft rubber or a soft resin and includes an annular portion 7 fitted into the circumferential groove 5 and a convex portion 8 that protrudes horizontally from the annular portion 7 and is distorted and deformed and contacts the inner surfaces of a concha cavity 12 and an antitragus 13 when used (see FIG. 2). The convex portion 8 may have any shape as long as it can be distorted and deformed. For example, the convex portion 8 may be shaped so as to protrude in a U-shape or V-shape (FIG. 2) or may be shaped so as to protrude in a balance toy-shape (FIG. 2). Multiple elastic adapters including convex portions 8 having different sizes and/or shapes may be prepared for selection and replacement as the elastic adapter 6.

The ring 3 is inserted into the concha cavity 12 with the elastic adapter 6 fitted into the ring 3 when used. At this time, the annular portion 7 and convex portion 8 made of the soft material rather than the ring 3 made of the hard resin contact the inner surfaces of the antitragus 13 and a tragus 14 and the inner surfaces of the concha cavity 12 and the like. For this reason, the user feels good and does not feel much discomfort (see FIG. 4). In this case, the convex portion 8 is effortlessly distorted and deformed so as to follow the shape of the inner surfaces of the concha cavity 12 and the like contacted by the convex portion 8 and presses the inner surface of the concha cavity 12 due to its resilience. As seen above, the ring 3 and elastic adapter 6 are effortlessly integrally inserted into the concha cavity 12, and the user obtains a good feeling of insertion without pain.

Vibration outputted from the bone conduction speaker 1 having the above configuration is transmitted to the concha cavity 12 and its vicinity as a bone-conducted sound through the ring 3. At this time, the vibration is transmitted directly to the earhole 11 and its vicinity through the ring 3, and the vibration transmission loss is minimized. This is because the bone conduction speaker 1 is fixed to the ring 3 through the column 4 and is placed at a position (height) at which the bone conduction speaker 1 does not contact the human body. Thus, the earhole 11 and its vicinity are vibrated efficiently, and an air-conducted sound is generated in an external auditory canal. Thus, a normal-hearing person using this bone conduction speaker unit is able to clearly hear a sound transmitted mainly through the drum.

Originally, the transmission characteristics of bone vibration are that the vibration of the skull directly reaches the auditory nerve, and the frequency characteristics of the transmitted vibration are that the vibration greatly attenuates at high frequencies in the audio frequency range. On the other hand, if the bone conduction speaker 1 is placed near the earhole 11, an air-conducted sound (leaking sound) generated by the vibration of the bone conduction speaker 1 also reaches the drum simultaneously. In this case, even if the generated air-conducted sound (leaking sound) is at a low level, it reaches the drum of the normal-hearing person as a sound having a sufficient volume. This is because the bone conduction speaker 1 is placed near the earhole 11. As described above, in the case of the bone conduction speaker unit according to embodiments of the present invention, the earhole 11 is open due to the opening of the ring 3. Thus, a sufficient amount of air-conducted sound (leaking sound) reaches the drum.

Figure 5:
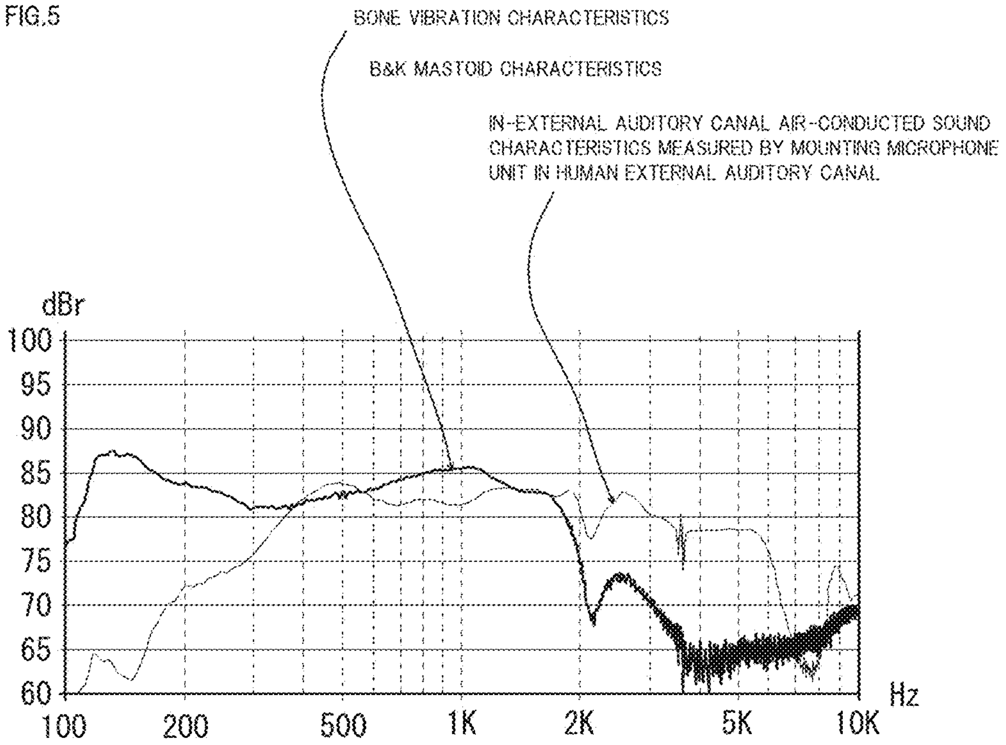
FIG. 5 is a graph showing frequency characteristics of the bone conduction speaker unit according to embodiments of the present invention.

FIG. 5 is a graph showing in-earhole air-conducted sound frequency characteristics obtained by measuring this air-conducted sound using a small microphone placed in the external auditory canal of the hearing person. FIG. 5 reveals that high-frequency characteristics have been greatly improved compared to data measured using MASTOID for measuring bone vibration available from Brüel & Kjær. A dynamic type bone conduction speaker was used for this measurement although any type of bone conduction speaker produces the same effects. A dynamic type bone conduction speaker easily generates a high-frequency sound due to its basic structure and can be suitably used when a normal hearing person appreciates music.

Figure 6:
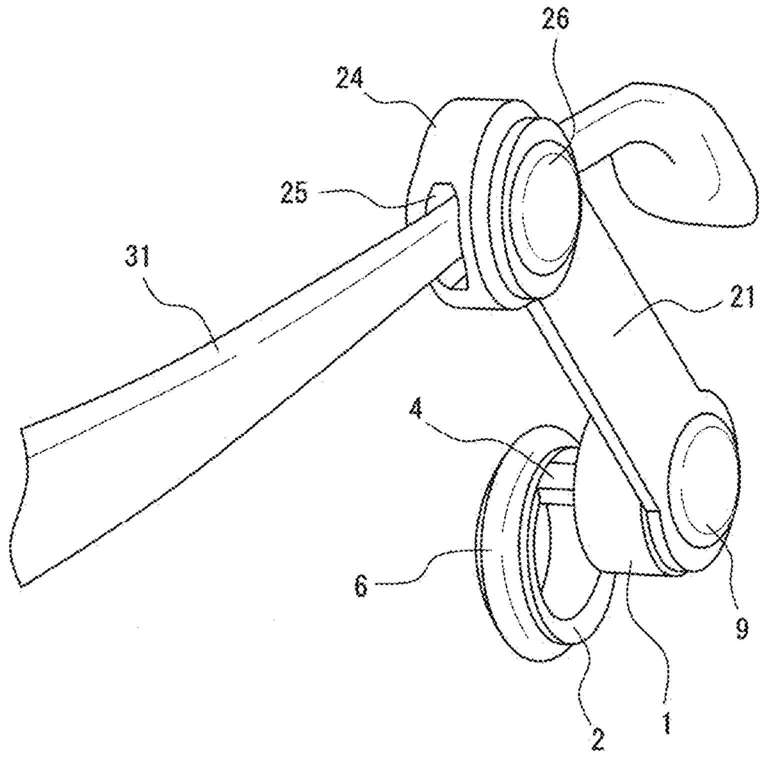
FIG. 6 is a perspective view showing a state in which a bone conduction speaker unit according to a second embodiment of the present invention is mounted.
Figure 7:
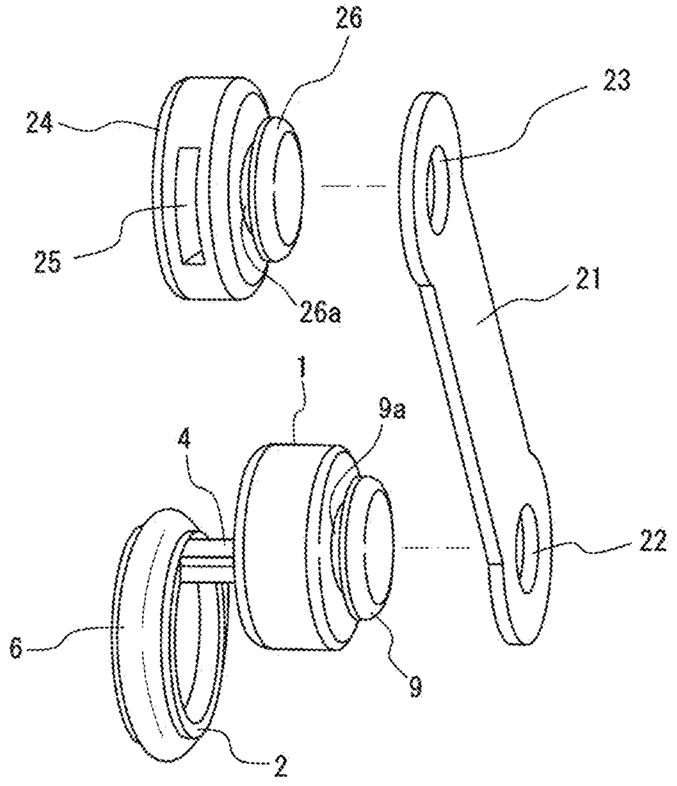
FIG. 7 is an exploded perspective view of an example configuration of the bone conduction speaker unit according to the second embodiment of the present invention.

FIGS. 6 and 7 are drawings showing a bone conduction speaker unit according to a second embodiment of the present invention. The second embodiment aims to improve mountability when a glasses wearer uses the bone conduction speaker unit according to embodiments of the present invention. To improve mountability, in the second embodiment, an elastic support strip 21 and a glasses mounting member 24 are added to the configuration of the first embodiment. Also, a circular lock portion 9 that aims to mount one end of the elastic support strip 21 on a bone conduction speaker 1 and includes a constriction 9*a* is formed on the bone conduction speaker 1.

The elastic support strip 21 is a strip made of a soft material, and fitting holes 22 and 23 are formed on its both ends. The fitting holes 22 and 23 can be expanded by pulling them. The glasses mounting member 24 is a block body made of a soft material, and a temple insertion hole 25 is formed through the glasses mounting member 24 from one side surface to another side surface. The glasses mounting member 24 is mounted on glasses by inserting a temple 31 of the glasses into the temple insertion hole 25 (FIG. 6). A lock portion 26 having a constriction 26*a* similar to that of the lock portion 9 is formed on one end surface of the glasses mounting member 24.

When the fitting hole 22 on one end of the elastic support strip 21 is pulled and expanded and then the lock portion 9 of the bone conduction speaker 1 is fitted into the fitting hole 22, the diameter of the fitting hole 22 is reduced on the constriction 9*a*. Thus, the one end of the elastic support strip 21 is locked and fixed to the bone conduction speaker 1 (FIG. 6). when the fitting hole 23 on the other end of the elastic support strip 21 is pulled and expanded and then the lock portion 26 of the glasses mounting member 24 is fitted into the fitting hole 23, the diameter of the fitting hole 23 is reduced on the constriction 26*a*. Thus, the other end of the elastic support strip 21 is locked and fixed to the glasses mounting member 24 (FIG. 6).

The glasses mounting member 24 is mounted on the glasses by inserting the temple 31 of the glasses into the temple insertion hole 25 (FIG. 6). The glasses mounting member 24 is made of a soft material. When the temple 31 is pushed into the temple insertion hole 25, starting with its tip, the temple insertion hole 25 is deformed in accordance with the shape of the temple 31. For this reason, it is easy to insert the temple 31 into the glasses mounting member 24, and the glasses mounting member 24 can be mounted on temples 31 having various shapes. Also, the glasses mounting member 24 can be shifted along the temple 31. Thus, when using the present bone conduction speaker unit, the user can place the glasses mounting member 24 in a desired position. That is, when using the present bone conduction speaker unit, the glasses wearer is able to obtain good mountability.

The bone conduction speaker 1 according to the second embodiment is held in position with the bone conduction speaker 1 supported by the glasses through the elastic support strip 21. For this reason, an elastic adapter 6 need not be provided with a convex portion 8 (of course, may be provided with it). The desired effects of the second embodiment are the same as those of the first embodiment except for the desired effects of the elastic support strip 21.

In the case of the above conventional example, vibration is transmitted from the bone conduction speaker to the antitragus and earlobe contacted by the bone conduction speaker and from the ring fixed to the bone conduction speaker 1 to the tragus. As a result, an air-conducted sound is generated in the external auditory canal. In this case, it is considered that the vibration is dispersed and the air-conducted sound generation efficiency of the antitragus and earlobe is lower than that of the tragus. On the other hand, in the case of the bone conduction speaker unit according to embodiments of the present invention, all the vibration of the bone conduction speaker 1 is transmitted to the tragus 14 and its vicinity. For this reason, it can be said that not only the bone-conducted sound transmission efficiency but also the air-conducted sound generation efficiency is high.

When mounting one of the bone conduction speaker units according to embodiments of the present invention thus configured, the elastic adapter is distorted and deformed. Thus, the bone conduction speaker unit is easily mounted in a fitted manner regardless of the size or shape of the ear. A normal-hearing person using it is not prevented from hearing an external sound because the unit does not block the earhole. Also, the bone conduction speaker is fixed to the ring through the column and is placed at a position (height) at which the bone conduction speaker does not contact a human body. Thus, the bone conduction speaker is able to efficiently transmit vibration output directly to the earhole and its vicinity through the ring and to efficiently generate an air-conducted sound in the external auditory canal by vibrating the earhole and its vicinity, including the tragus. As a result, a sound quality improvement effect is obtained. The second embodiment produces an effect of improving mountability when a glasses wearer uses the bone conduction speaker unit. For these reasons, the industrial applicability of the bone conduction speaker units according to embodiments of the present invention is high.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A bone conduction speaker unit comprising:
a bone conduction speaker; and
support means that supports the bone conduction speaker and is configured to be housed in a concha cavity, wherein the support means comprises:
a ring having, on a top surface thereof, a column fixed to a bottom surface of the bone conduction speaker; and
an elastic adapter fitted into a circumferential groove formed on an outer circumferential surface of the ring.

2. The bone conduction speaker unit of claim 1, wherein the elastic adapter comprises:
an annular portion fitted into the circumferential groove; and
as convex portion that protrudes horizontally from the annular portion and contacts an inner surface of the concha cavity when used.

3. The bone conduction speaker unit of claim 2, wherein the convex portion protrudes in a U-shape or V-shape.

4. The bone conduction speaker unit of claim 2, wherein the convex portion protrudes in a balance toy-shape.

5. The bone conduction speaker unit of claim 1,
wherein the ring is made of a hard resin, and
wherein the elastic adapter is made of a soft material.

6. The bone conduction speaker unit of claim 1, wherein a plurality of elastic adapters having different sizes and/or shapes are prepared for selection and replacement as the elastic adapter.

7. The bone conduction speaker unit of claim 1, wherein the bone conduction speaker is disposed such that a portion thereof covers an opening of the ring.

8. A bone conduction speaker unit comprising:
a bone conduction speaker;
support means that supports the bone conduction speaker and is configured to be housed in a concha cavity; and
glasses mounting means configured to cause glasses to support the bone conduction speaker,
wherein the support means comprises:
a ring having, on a top surface thereof, a column fixed to a bottom surface of the bone conduction speaker; and
an elastic adapter fitted into a circumferential groove formed on an outer circumferential surface of the ring,
wherein the glasses mounting means comprises:
an elastic support strip; and
a glasses mounting member,
wherein the elastic support strip has a first end fixed to the bone conduction speaker and a second end fixed to the glasses mounting member,
wherein a temple insertion hole is formed through the glasses mounting member, and
wherein the glasses mounting member is mounted on the glasses by inserting a temple of the glasses into the temple insertion hole.

9. The bone conduction speaker unit of claim 8,
wherein a first fitting hole is formed on the first end of the elastic support strip and a second fitting hole is formed on the second end of the elastic support strip,
wherein the first end of the elastic support strip is fixed to the bone conduction speaker by fitting a lock portion formed on the bone conduction speaker into the first fitting hole, and
wherein the second end of the elastic support strip is fixed to the glasses mounting member by fitting a lock portion formed on the glasses mounting member to the second fitting hole.

10. The bone conduction speaker unit of claim 8,
wherein the ring is made of a hard resin, and
wherein the elastic adapter is made of a soft material.

11. The bone conduction speaker unit of claim 8, wherein a plurality of elastic adapters having different sizes and/or shapes are prepared for selection and replacement as the elastic adapter.

12. The bone conduction speaker unit of claim 8, wherein the bone conduction speaker is disposed such that a portion thereof covers an opening of the ring.

* * * * *